Sept. 16, 1969  E. H. NIXON ETAL  3,467,859
SYSTEM FOR TESTING A UNIT AT DISCRETE FREQUENCIES UTILIZING
A HARMONIC SPECTRUM GENERATOR AND MEASURING MEANS
ENABLED ONLY AT THE DISCRETE FREQUENCIES
Filed Oct. 28, 1966  3 Sheets-Sheet 1

INVENTORS
E. H. NIXON
J. W. WHEELER
BY S. Gundersen
ATTORNEY

United States Patent Office 3,467,859
Patented Sept. 16, 1969

3,467,859
SYSTEM FOR TESTING A UNIT AT DISCRETE FREQUENCIES UTILIZING A HARMONIC SPECTRUM GENERATOR AND MEASURING MEANS ENABLED ONLY AT THE DISCRETE FREQUENCIES
Earl Hollis Nixon and John Watson Wheeler, Greensboro, N.C., assignors to Western Electric Company, Incorporated, New York, N.Y., a corporation of New York
Filed Oct. 28, 1966, Ser. No. 590,247
Int. Cl. G01r 27/00, 23/16
U.S. Cl. 324—57
9 Claims

ABSTRACT OF THE DISCLOSURE

A circuit for determining the characteristics of a unit under test at N discrete frequencies applies a sweep frequency to the input of the unit under test and to a mixer circuit which modulates the sweep frequency signal with the output of an harmonic spectrum generator. The difference product of the modulated signal is detected to produce pulses when the sweep frequency sweeps through the harmonic frequencies of the harmonic spectrum generator. The detected pulses control the operation of a measuring circuit connected to the output of the unit under test to obtain characteristics of the unit at discrete frequencies determined by the frequencies of the harmonic generator. The circuit tests at frequencies within a predetermined band of frequencies and prevents errors due to malfunction of the sweep frequency oscillator.

---

This invention relates to testing circuits and more particularly to a circuit for testing characteristics of a unit at several different frequencies.

In the manufacture of microwave transmission networks, it is desirable to automatically determine the characteristics of the networks at different frequencies and to record these characteristics, for example, in a digital recorder or computer. Heretofore, the testing of units for characteristics at different frequencies required hand manipulated apparatus which did not determine the characteristics in a form which could be directly fed to a recorder or computer.

An object of the present invention is a circuit for testing the characteristics of a unit at different frequencies.

Another object of the present invention is a circuit which automatically determines the characteristics of a unit at different frequencies in a form which may be fed to a computer.

In accordance with these and other objects, the present invention contemplates a circuit which applies a sweep frequency signal both to the input of a unit under test and to a mixer circuit which modulates the sweep frequency signal with the output of a harmonic spectrum generator. The difference product of the modulated signal is detected to produce pulses when the sweep frequency sweeps through the harmonic frequencies of the harmonic spectrum generator. The detected pulses control the operation of a measuring circuit connected to the output of the unit to obtain the characteristics of the unit at discrete frequencies determined by the frequencies of the harmonic generator.

A complete understanding of this invention may be had by reference to the following detailed description when considered in conjunction with the accompanying drawings wherein:

FIG. 4 is a diagram of an alternate circuit for testing characteristics of a unit at several different frequencies.

Figure 1:
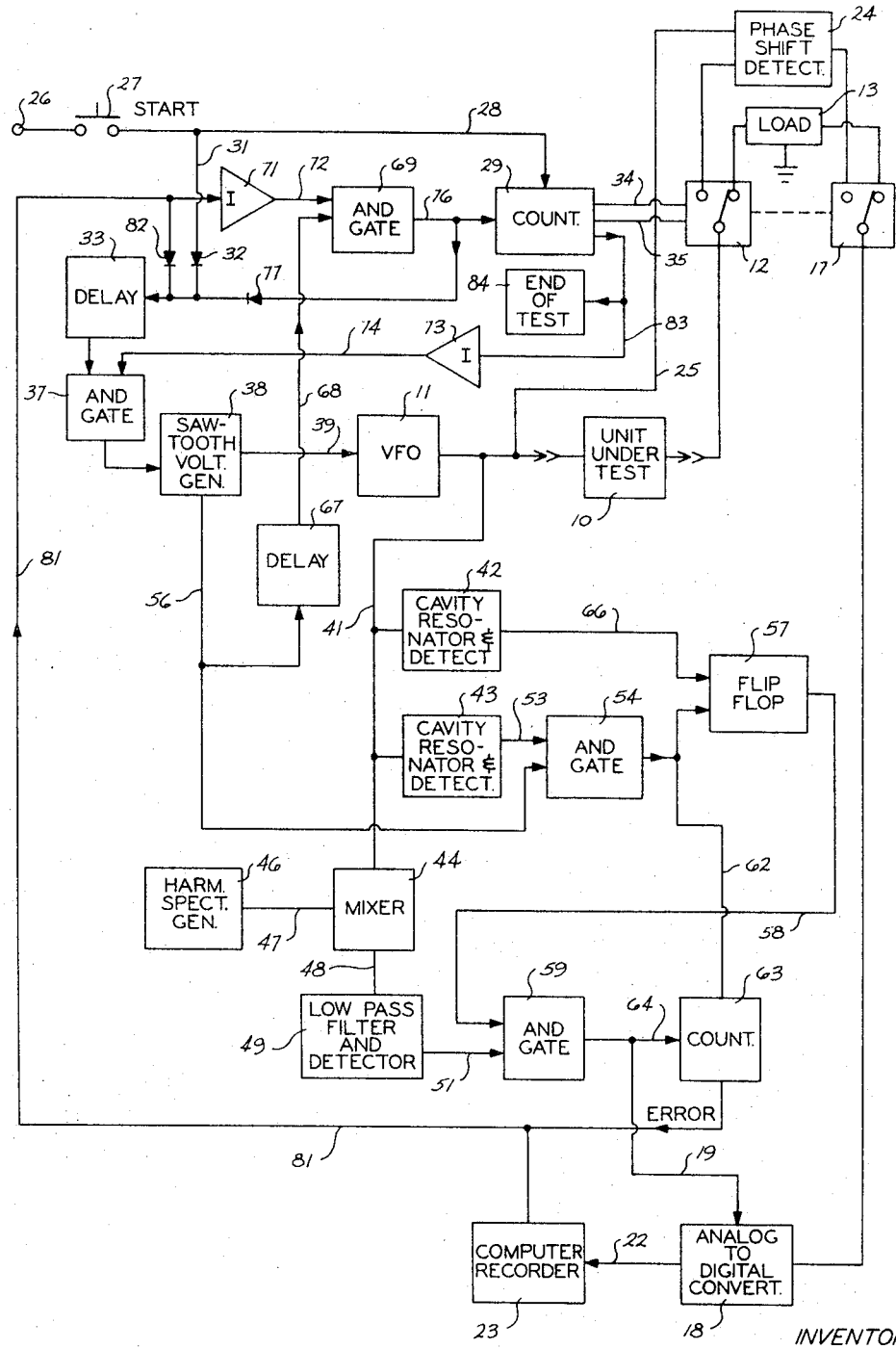
FIG. 1 is a diagram of a preferred circuit for testing characteristics of a unit at several different frequencies.

Referring first to FIG. 1, there is shown a circuit for testing various characteristics of a unit 10 such as a transmission network at N discrete frequencies. Unit 10 is connected to the circuit to connect the output of a variable frequency oscillator 11 to the input of the unit 10. A switch 12 connects the output of the unit 10 to a load 13 and a switch 17 connects the load 13 to an analog to digital converter 18. As the frequency of the variable oscillator 11 is changed, pulses are applied through a lead 19 to the analog to digital converter 18 to sense the voltage across the load 13 at the N discrete frequencies. The output of the analog to digital converter 18 passes through a lead 22 to a computer or recorder 23 to record the impedance of the unit 10 at the N discrete frequencies.

In the next test, the switch 12 connects the output of the unit 10 to a first input of a phase shift detector 24. The output of the variable frequency oscillator 11 is connected by a lead 25 to a second input of the phase shift detector 24. The output of the phase shift detector 24 is connected by the switch 17 to the analog to digital converter 18. As the frequency of the oscillator 11 changes, pulses applied through the lead 19 to the analog to digital converter 18 operate the converter to sense the phase shift of the unit 10 at the N discrete frequencies.

The switches 12 and 17 may have additional contacts (not shown) to connect the circuit to additional characteristic sensing devices (not shown).

In order to initially start the operation of the testing circuit, a start switch 27 is closed to apply a signal from a source 26 through a lead 28 to a counter 29 and through a lead 31 and a diode 32 to a delay circuit 33. The signal on the lead 28 resets the counter 29 so that a signal is produced on a first output lead 34 from the counter 29. The first output lead 34 of the counter 29 is connected to the switches 12 and 17 for operating those switches to connect the load 13 to the unit 10 and to the analog to digital converter 18.

The delay circuit 33 initiates a sweep frequency cycle. A delayed pulse from the delay circuit 33 passes through an AND gate 37 to a sawtooth voltage generator 38 to produce a sawtooth voltage pulse. The sawtooth voltage pulse from the generator 38 is applied by a lead 39 to the variable frequency oscillator 11. The frequency of the oscillator 11 is proportional to the magnitude of voltage applied to its input and thus the increase in the sawtooth voltage increases the frequency of the oscillator 11. The oscillator 11 sweeps in frequency across a frequency band which includes the desired N test frequencies.

Pulses 52 (FIG. 2) are produced by a low pass filter and detector 49 when the frequency of the oscillator 11 substantially equals one of the desired test frequencies. A lead 41 connects the output of the oscillator 11 to a first input of a mixer 44. A harmonic generator 46 is connected by a lead 47 to a second input of the mixer 44. The output signal of the harmonic generator has harmonic frequency components which are substantially equal to the desired test frequencies. The output of the mixer 44 is applied by a lead 48 to the low pass filter and detector 49. As the frequency of the oscillator 11 sweeps, beat frequencies, which are the difference between the harmonic generator output and the oscillator output, sweep through zero frequency to be detected by the low pass filter and detector 49 to produce the output pulses 52 on a lead 51. A beat pulse 52 is produced when the frequency of the oscillator 11 substantially equals one of the harmonic frequencies produced by the harmonic spectrum generator 46; thus, each of the pulses 52 is produced when the oscillator 11 produces a discrete frequency as determined by the harmonic frequencies of the spectrum generator 46.

Only pulses 52, which are produced after the oscillator 11 has increased to a frequency $F_0$ (FIG. 2), are passed to the lead 19 to operate the analog to digital converter 18. When the frequency of the variable oscillator 11 has increased to a frequency $F_0$, a cavity resonator and detector 43 connected to the oscillator 11 produces an output pulse on lead 53 which is applied to a first input of an AND gate 54. A rectangular voltage pulse produced on an output lead 56 of the sawtooth generator 38 when the generator 38 is producing a sawtooth pulse on lead 39, is applied to a second input of the AND gate 54. When the rectangular pulse from the generator 38 is present, the output pulse of the cavity resonator and detector 43 passes through the AND gate 54 to a bistable multivibrator or flip-flop 57 to change the flip-flop 57 from a first state to a second state. When the flip-flop 57 is in its second state, a signal on a lead 58 is applied to an input of an AND gate 59. A second input of the AND gate is connected to the output of the low pass filter and detector 49 by the lead 51; and thus, only pulses 52 on the lead 51 which occur after the frequency $F_0$ pass through the AND gate 59 to the lead 19 to operate the analog to digital converter 18.

A lead 62 connects the output of the AND gate 54 to a reset input of a counter 63; thus, the pulse produced by the cavity resonator and detector 53 resets the counter 63. A lead 64 from the AND gate 59 applies the pulses 52 which pass through the AND gate 59 to the counter 63 to count the number of pulses 52 occurring after the frequency $F_0$.

Figure 2:
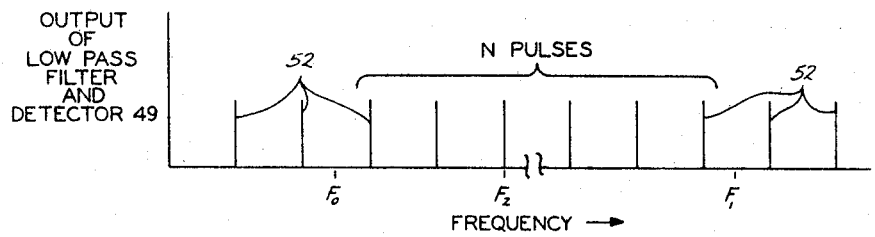
FIG. 2 is a chart of the frequency response of the low pass filter and detector shown in FIG. 1.

As the frequency of the oscillator 11 continues to increase, it reaches a frequency $F_1$ (see FIG. 2) which is sensed by the cavity resonator and detector 42 to apply a pulse over a lead 66 to a second input of the flip-flop 57. The pulse on the lead 66 switches the flip-flop 57 from its second state back to its first state which opens the gate 59 to prevent additional pulses 52 on the lead 51 from passing to the analog to digital converter 18 and counter 63. As shown in FIG. 2, there are N pulses 52 produced between the frequencies $F_0$ and $F_1$. The analog to digital converter 18 produces N digital readings at discrete frequencies of the oscillator 11.

The rectangular pulse from the sawtooth voltage generator 38 is also applied to a delay circuit 67 to initiate another frequency sweep cycle. The delay circuit 67 delays the rectangular pulse produced by the generator 38 for a duration longer than that required by the generator 38 to complete its generation of the sawtooth pulse and return to its initial voltage output. The output of the delay circuit 67 is applied by a lead 68 to a first input of an AND gate 69. Normally, a signal is applied by an inverter 71 over a lead 72 to a second input of the AND gate 69. Thus, the pulse from the delay 67 passes through the AND gate 69 and is applied through a lead 76 to the counter 29 to advance the counter.

Stepping of the counter 29 produces an output signal on a second lead 35 connected to the switches 12 and 17 to connect the respective contacts of the switches 12 and 17 to the phase detector 24 in preparation for a second test. Also, the pulse on the lead 76 is applied through a diode 77 to the delay 33 to initiate another operation of the sawtooth voltage generator 38 to again sweep the frequency of the oscillator 11 to record N readings of the phase shift of the unit 10 at the respective N discrete frequencies.

Figure 3:
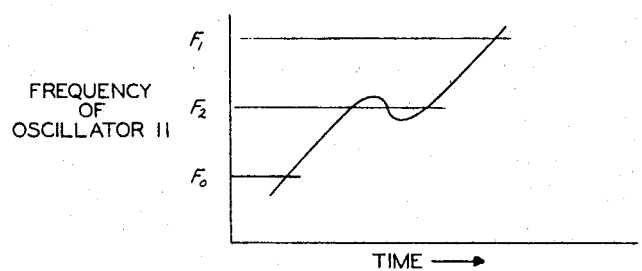
FIG. 3 is a curve of the sweep frequency of the oscillator shown in FIG. 1 wherein there is an erroneous retrace of the frequency.
Figure 2:
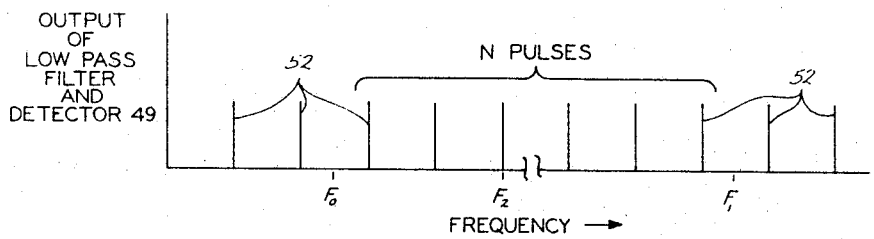
Figure 3:
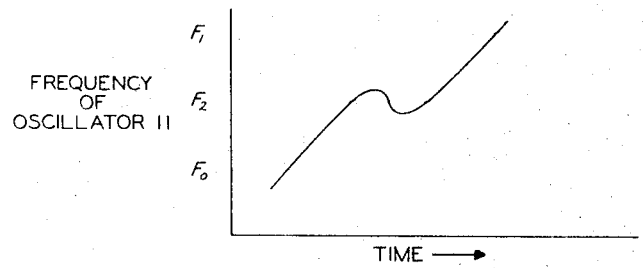

Referring now to FIG. 3, if the oscillator 11, as it increases in frequency from $F_0$ to $F_1$, has a slight momentary loss of voltage, the frequency will retrace and may pass through some frequency $F_2$ three times. If one of the harmonics of the harmonic generator 46 is $F_2$, the output of the low pass filter and detector 49 will produce two extra erroneous pulses as the frequency sweeps through frequency $F_2$ three times. When the frequency $F_1$ is reached, the counter 63 records an extra number of beat pulses 52 to produce an error signal over a lead 81.

The error signal on the lead 81 passes to the computer 23, the inverter 71, and the delay circuit 33 to reject the recorded information and initiate another cycle of the sweep frequency output. The error signal causes the computer or recorder 23 to reject the data just recorded from the analog to digital converter 18. Also, the error signal produces a zero output from the inverter 71 on the lead 72 to disable the AND gate 69 and thus prevent the pulse from the delay 67 from stepping the counter 29 to the next test. The diode 82 connects the lead 81 to the delay 33, to pass the error signal to the delay circuit 33 to initiate the operation of the generator 38. Thus, another test is automatically initiated to replace the previous erroneous test.

After all the tests have been properly performed, the counter 29 is stepped to produce an output signal on a lead 83 to stop the automatic cycling of the test circuit. The output signal on the lead 83 is applied to the input of the inverter 73 which produces a zero output to the lead 74 to disable the AND gate 37 to prevent operation of the generator 38. Also, the signal on lead 83 is applied to an end of test indicator 84 to inform an operator that the test is complete. The operator may then connect another unit 10 to the circuitry and push the start button 27 to initiate the testing of the next unit.

FIG. 4 shows an alternative embodiment of the invention which does not include the error checking features of the circuit in FIG. 1. The flip-flop 57 is changed from its second state to its first state by a signal on a lead 86 connected to the counter 63. The signal on lead 86 is produced when the counter has counted N pulses produced by the low pass filter and detector 49 after the frequency $F_0$. The alternative circuit operates in the same manner as the preferred circuit shown in FIG. 1 except that if there is a momentary loss of voltage on the variable frequency oscillator 11, and the frequency retraces across the frequency $F_2$, the analog to digital converter 18 senses the first N pulses produced; thus, an error caused by the momentary loss of voltage to the operator 11 will not be detected in the alternative embodiment.

It is to be understood that the above-described embodiments of the invention are simply illustrative of the principles of the invention and that many modifications may be made within the scope of the invention.

What is claimed is:

1. A circuit for determining characteristics of a unit at N discrete frequencies:

a harmonic spectrum generator for producing at least N harmonic frequencies;

a variable frequency oscillator having means for sweeping the frequency of the oscillator through a frequency band containing the N harmonic frequencies;

means for connecting the output of the oscillator to the input of the unit;

a mixer circuit having a first input connected to the output of the variable frequency oscillator and a second input connected to the output of the harmonic spectrum generator;

a detector connected to the output of the mixer circuit for producing an output pulse when the oscillator frequency substantially equals one of the harmonic frequencies; and measuring means connected to the output of the unit for producing an output signal indicative of a characteristic of the unit, said measuring means including means connected to the output of the detector for normally disabling the measuring means and for enabling the measuring means when an output pulse from the detector is present in produce N signals indicative of characteristics of the unit at N discrete frequencies.

2. A circuit for determining characteristics of a unit at N discrete frequencies as defined in claim 1 wherein the measuring means includes:
- a characteristic sensing device connected to the output of the unit for producing an output voltage having a magnitude dependent upon the characteristics being measured; and
- analog to digital converter means connected to the sensing device output and the detector output for producing a digital output representing the characteristic measured only when a detector output pulse is present.

3. A circuit for determining characteristics of a unit at N discrete frequencies as defined in claim 1 which includes:
- first narrow bandwidth filter means connected to the oscillator output for producing an output pulse when the oscillator sweeps through a first frequency;
- second narrow bandwidth filter means connected to the oscillator output for producing an output pulse when the oscillator sweeps through a second frequency; and
- gating means connected to the first and second filter means for preventing the operation of the measuring means except in the frequency band between the first frequency and the second frequency.

4. A circuit for determining characteristics of a unit at N discrete frequencies as defined in claim 1 which includes:
- narrow bandwidth filter means connected to the oscillator output for producing an output pulse when the oscillator sweeps through a first frequency; and
- gating means having a first input connected to the output of the detector and a second input connected to the output of the filter means for preventing the application of output pulses from the detector to the measuring means until after the oscillator has swept through the first frequency.

5. A circuit as defined in claim 3 wherein the gating means includes:
- a bistable circuit having a first input connected to the first filter means and a second input connected to the second filter means, said bistable circuit changing from a first state to a second state when the first filter means produces a pulse and from the second state to the first state when the second filter means produces a pulse; and
- an AND gate connected to the bistable circuit and between the detector and the measuring means for passing pulses to the measuring means only when the bistable circuit is in its second state.

6. A circuit as defined in claim 5 which includes: means for preventing the bistable circuit from changing from its first state to its second state except when the frequency of the oscillator is increasing.

7. A circuit as defined in claim 5 which includes:
- counting means connected to the output of the AND gate for determining that a predetermined number of pulses pass through the AND gate.

8. A circuit for determining characteristics of a unit at N discrete frequencies as defined in claim 2 which includes:
- first narrow bandwidth filter means connected to the oscillator output for producing an output pulse when the oscillator sweeps through a first frequency;
- second narrow bandwidth filter means connected to the oscillator output for producing an output pulse when the oscillator sweeps through a second frequency;
- a bistable circuit having a first input connected to the first filter means and a second input connected to the second filter means, said bistable circuit changing from a first state to a second state when the first filter means produces a pulse and from the second state to the first state when the second filter means produces a pulse; and
- and AND gate connected to the bistable circuit and between the detector and the analog to digital converter means for passing pulses to the converter means only when the bistable circuit is in its second state, whereby the converter means operates only in the frequency band between the first frequency and the second frequency.

9. A circuit as defined in claim 4 which includes:
- counting means connected to the output of the gating means for sensing the number of pulses produced by the detector after the oscillator has swept through the first frequency; and wherein the gating means includes:
  - a bistable circuit having a first input connected to the filter means and a second input connected to the counting means, said bistable circuit changing from a first state to a second state when the filter means produces a pulse and from the second state to the first state when the counter senses a predetermined number of pulses from the gating means; and
  - an AND gate connected to the bistable circuit and between the detector and the measuring means for passing pulses to the measuring means only when the bistable circuit is in its second state.

References Cited

UNITED STATES PATENTS 3,382,432    5/1968    Schittko et al. _____ 324—57

EDWARD E. KUBASIEWICZ, Primary Examiner

U.S. Cl. X.R.

324—77

UNITED STATES PATENT OFFICE
CERTIFICATE OF CORRECTION

Patent No. 3,467,859     Dated September 16, 1969

Inventor(s) EARL H. NIXON and JOHN W. WHEELER

It is certified that error appears in the above-identified patent and that said Letters Patent are hereby corrected as shown below:

Title: Cancel "System for Testing a Unit at Discrete Frequencies"
       Insert --A Circuit Utilizing a Harmonic Spectrum Generator for Testing a Unit at Discrete Frequencies--;

Column 4, line 75, cancel "in" and insert --to--;
Column 6, line 22, cancel "and" and insert --an--.

Signed and sealed this 7th day of July 1970.

(SEAL)
Attest:

EDWARD M. FLETCHER, JR.
Attesting Officer

WILLIAM E. SCHUYLER, JR.
Commissioner of Patents